United States Patent Office 3,494,215
Patented Feb. 10, 1970

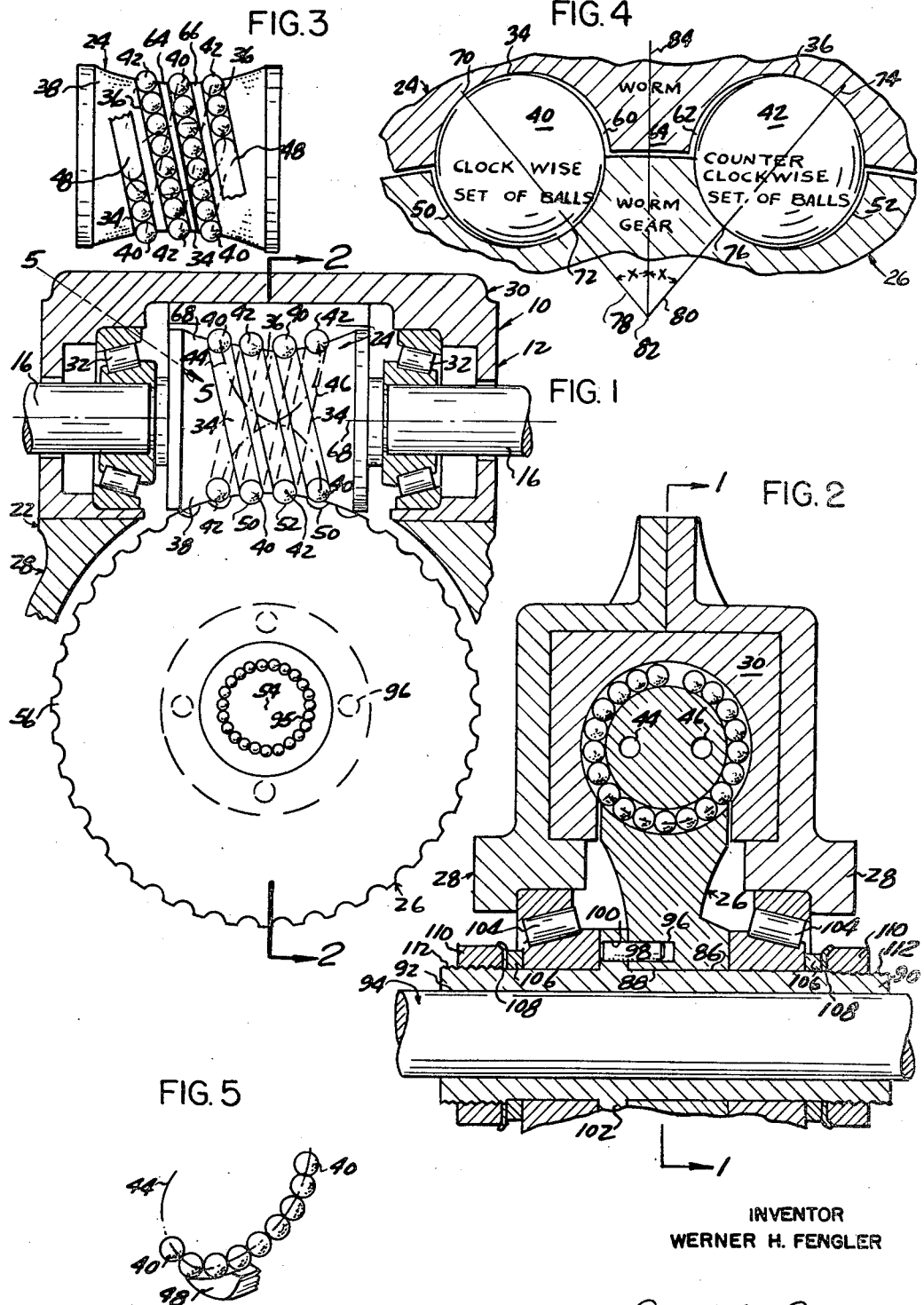

3,494,215
ANTI-BACKLASH SPEED-REDUCTION GEARSET
Werner H. Fengler, 23651 Fordson Drive,
Dearborn, Mich. 48124
Original application July 13, 1966, Ser. No. 564,975.
Divided and this application Nov. 18, 1968, Ser.
No. 776,423
Int. Cl. F16h 55/18, 55/22
U.S. Cl. 74—409                         2 Claims

ABSTRACT OF THE DISCLOSURE

This speed-reduction gearset eliminates backlash by employing an arcuately-grooved worm around which and through which two independent sets of anti-friction bearing balls circulate in the same direction of travel while rotating in opposite directions, both sets of engaging a similarly grooved worm gear while the oppositely-rotating balls in engagement with the opposite sides of the worm wheel teeth are crowded toward one another into tight anti-backlash engagement therewith, whereby to eliminate sliding friction and retain only rolling friction.

---

This is a division of my co-pending application Ser. No. 564,975, filed July 13, 1966, for High-Torque Stepping-Motor-Driven-Speed-Reducing Prime Mover.

FIGURE 1 is a central vertical section through an anti-backlash reduction gear set including a ball bearing nut on a ball bearing screw shaft according to one form of the invention, but with the balls omitted except at the top and bottom of the worm in order to show the double helical worm ball grooves more clearly.

FIGURE 2 is a longitudinal section taken along the line 2—2 in FIGURE 1, except that within the worm the section is taken along the center line of one of the helical ball grooves for one revolution thereof, in order to show their relationship more clearly;

FIGURE 3 is a fragmentary top plan view of the worm shown in FIGURES 1 and 2, removed from the reduction gear set;

FIGURE 4 is an enlarged fragmentary view of the central portion of the vertical section of FIGURE 1, showing two oppositely-rotative similarly-traveling balls of the driving worm in crowded engagement with the opposite sides of a tooth in the worm gear, indicating the contact angles of the opposing forces; and FIGURE 5 is a diagrammatic view looking in the direction of the arrow 5—5 in FIGURE 1, showing a guide finger employed to direct the bearing balls into each internal ball passageway of the worm.

Referring to the drawings in general, FIGURES 1 to 5 inclusive show an anti-backlash stepping motor-driven power unit, generally designated 10, according to one form of the invention, as consisting generally of an improved anti-backlash reduction gear set 12 driven step-by-step by an improved high-torque reversible stepping motor (not shown) through a common shaft 16. The speed reduction gear set 12 is shown, for purposes of exemplification, as rotating an internally-threaded ball bearing anti-friction nut which, in turn, advances or retracts a non-rotatable ball bearing screw shaft as the output of the power unit 10, as more fully explained below.

Referring to FIGURES 1 to 5 inclusive of the drawings in detail, there is shown in FIGURES 1 and 2 a gear set 12 which includes a casing 22 enclosing a worm 24 meshing with a worm gear 26, the worm 24 being directly and drivingly connected to the shaft 16 from the stepping motor (not shown). For convenience and simplicity of disclosure, the worm 24 is shown as integral with the shaft 16. The casing 22 is provided with a worm gear casing portion 28 enclosing the worm gear 26 and a worm back-up block 30 enclosing the worm 24 as well as housing anti-friction bearing units 32 in which the shaft 16 is journaled.

The worm 24 is preferably of the concave so-called close-fitting or double-enveloping "Cone" drive type with twin spiral or helical grooves 34 and 36 (FIGURE 3) encircling the worm body 38 independently of one another and carrying two independent sets of anti-friction bearing balls 40 and 42 respectively. The grooves 34 and 36 are of approximately semi-circular cross-section and the sets of balls 40 and 42 are closely packed to roll in them in the same direction of travel while rotating in opposite directions of rotation, returning in the same direction from one end to the other of the worm body 38 through two curved independent internal passageways 44 and 46 therein (FIGURE 2). The balls 40 and 42 are directed into the ball return passageways 44 and 46 by guide fingers 48 (FIGURE 5).

The ball grooves 34 and 36 in the worm body 38 are aligned with similar transverse grooves 50 and 52 of approximately semi-circular cross-section and alternating in occurrence around the periphery of the worm gear 26 as well as directed obliquely to the axis 54 of the worm gear 26 across the periphery 56 thereof. Thus, the bearing balls 40 and 42 serve to transmit power from the worm 24 to the worm gear 26 as they roll around their respective helical grooves 34 and 36 in the worm body 38 and momentarily engage the respective oblique grooves 50 and 52 in the worm gear periphery 56. It will be seen from FIGURE 4 that the worm grooves 34 and 36 for the power transmission balls 40 and 42 are offset transversely by a slight amount relatively to the worm gear grooves 50 and 52 so that the balls 40 and 42 are, in effect, crowded against the worm gear teeth 58 disposed between the ball grooves 50 and 52 and with clearances 60 and 62 on opposite sides of the balls 40 and 42 adjacent the double worm threads 64 and 66 located between the ball grooves 34 and 36. The set of balls 40 may be designated the clockwise-rotating set of balls (FIGURE 4) and the set of balls 42 the counterclockwise-rotating set of balls, from their opposite rotation during their travel in operation.

It will be understood that the characteristics of the worm 24 and worm wheel 26 may be varied and that the characteristics shown in FIGURES 1 to 4 inclusive are but one exemplification thereof. In the gear set 12 of FIGURES 1 to 4 inclusive, the worm gear 26 moves eighteen degrees for each revolution of the worm 24. As the pitch of the two helical worm grooves 34 is slight, the distance between all portions of any given worm groove 34 or 36 and the axis 68 of the worm 24 and shaft 16 is nearly uniform provided that, as is customary, the worm gear periphery 56 has the ball grooves 50 and 52 of the proper concavity in an axial direction (FIGURE 2) to embrace the periphery 68 of the worm body 38. Thus, in the exemplary gear set 12 shown in FIGURES 1 to 4 inclusive, the pitch of the worm 24 and radius of the worm gear 26 have been so chosen that one revolution of the worm 24 causes an 18-degree rotation of the gear 26. In FIGURE 4, the contact points 70, 72 and 74, 76 of the clockwise- and counterclockwise- rotating balls 40 and 42 establish lines of contact 78 and 80 subtending the angles X at their point of intersection 82 in the median plane 84 of the worm 24 and worm gear 26. For the worm 24 to wrap itself hourglass-like around the gear 26, the root diameter of each worm helix is increased by the parabola formula $x^2 = 4f(y-k)$ in rectangular coordinates, where $x$ and $y$ are the coordinate values of a given point thereon, $f$ is the distance between the focus and apex of the parabola, and $k$ is the distance of offset of the apex from the $x$ axis. An approximately 300 degree rotation of the worm 24 opens up the root of each helix sufficiently to permit the balls 40 and 42 to disengage themselves from the gear 26 and be deflected by their respective guide fingers into the internal return passageways of the worm.

The worm gear 26 (FIGURE 2) is provided with a central axial bore 86 which snugly but slidably receives the smooth intermediate portion of the external surface 88 of an internally-threaded sleeve or elongated nut 90. The internally-threaded bore 92 of the elongated tubular nut 90 threadedly engages by a set of steel balls 95 an externally-threaded screw shaft 94 which is provided with a keyway engaged by a key or other means (not shown) for preventing its rotation while permitting its axial motion. The screw shaft 94 is rotatably supported by the nut 90 on its own anti-friction balls 95 (FIGURE 1) for smooth and precise reciprocation. The worm gear 26 near its central axial bore is provided with a plurality of adjacent axial sockets or blind holes 96, four being shown, spaced circumferentially apart from one another (FIGURE 1). Snugly engaging the sockets 96 are drive pins 98, the opposite ends of which snugly engage similarly-circumferentially-spaced axial holes 100 in a radial flange 102 projecting outwardly from the periphery of the tubular nut 90.

Also mounted on the smooth intermediate portion of the surface 88 of the tubular nut 90 on opposite sides of the hub of the worm gear 26 are the inner races of anti-friction roller bearings 104, the axes of which converge toward the opposite ends of the tubular nut 90. The worm gear casing portion 28 is recessed to receive the outer races of the roller bearings 104, whereas the inner races thereof are held firmly against the opposite ends of the hub of the worm gear 26 and held in place by annular spacers 106, washers 108 and nuts 110 threaded into the externally-threaded opposite end portions 112 of the tubular nut 90. The tubular nut 90 is a dual preloaded ball bearing nut with wiper and, with the screw shaft 94, is conventional and available as a unit on the open market.

From FIGURES 1 and 4 it will be seen that only a single tooth 56 of the worm gear 26 is, at any one time, subjected to pre-loading engagement by any one pair of the balls 40 and 42 in order to prevent backlash. It is thus self-evident that subsequent backlash, arising from wear after extended use, can be eliminated by moving the axis of the worm 24 toward the axis of the worm gear 26 by an amount sufficient to take up such wear and thus reimpose the pre-loading of the balls 40 and 42 on the gear wheel teeth 56.

What I claim is:
1. An anti-backlash speed reduction worm gear set, including
a gear set casing,
rotary power input and output members journalled in said casing,
a worm gear operatively connected to said output member and having multiple circumferentially-spaced teeth around the periphery thereof and ball grooves disposed between said teeth,
a worm connected to said power input member and having two independent helical external ball grooves crossing said worm gear ball grooves in close proximity thereto and having two independent internal ball return passageways therethrough interconnecting the opposite ends of the respective independent external worm ball grooves,
and two independent sets of power-transmitting balls mounted in said worm ball grooves in closely-packed rolling relationship thereto,
the pitch of said independent sets of worm ball grooves being shifted axially relatively to each other and the pitch of said independent sets of worm gear ball grooves also being displaced axially relatively to each other whereby the balls of said two sets traverse the worm gear teeth in crowding anti-backlash engagement therewith.

2. An anti-backlash speed reduction gear set, according to claim 1, wherein only a single tooth of said worm gear is engaged at any one time by the pre-loaded balls running in said grooves across the periphery of said worm gear.

References Cited
UNITED STATES PATENTS

| | | | |
|---|---|---|---|
| 1,152,001 | 8/1915 | Brinkman | 74—458 |
| 2,455,487 | 12/1948 | Hoffar | 74—458 |
| 2,664,760 | 1/1954 | Booth | 74—458 |
| 2,936,645 | 5/1960 | Morris et al. | 74—441 |
| 3,258,983 | 7/1966 | Valenti | 74—409 |

LEONARD H. GERIN, Primary Examiner

U.S. Cl. X.R.

74—425, 441, 458, 459